(12) United States Patent
Kawase et al.

(10) Patent No.: US 11,718,716 B2
(45) Date of Patent: Aug. 8, 2023

(54) AEROGEL AND PRODUCTION METHOD OF AEROGEL

(71) Applicant: TIEM FACTORY INC., Tokyo (JP)

(72) Inventors: Noboru Kawase, Tokyo (JP); Mamoru Aizawa, Tokyo (JP)

(73) Assignee: TIEM FACTORY INC., Tokyo (JP)

( * ) Notice: Subject to any disclaimer, the term of this patent is extended or adjusted under 35 U.S.C. 154(b) by 0 days.

(21) Appl. No.: 17/049,168

(22) PCT Filed: Apr. 6, 2020

(86) PCT No.: PCT/JP2020/015510
§ 371 (c)(1),
(2) Date: Oct. 20, 2020

(87) PCT Pub. No.: WO2021/029107
PCT Pub. Date: Feb. 18, 2021

(65) Prior Publication Data
US 2021/0246267 A1 Aug. 12, 2021

(30) Foreign Application Priority Data

Aug. 13, 2019 (JP) .................. 2019-148498

(51) Int. Cl.
*C08G 77/04* (2006.01)
*B01J 13/00* (2006.01)
*C08J 9/28* (2006.01)

(52) U.S. Cl.
CPC ........ *C08G 77/045* (2013.01); *B01J 13/0091* (2013.01); *C08J 9/283* (2013.01);
(Continued)

(58) Field of Classification Search
CPC ..... C08G 77/045; B01J 13/0091; C08J 9/283; C08J 2201/0502; C08J 2201/0546; C08J 2205/026; C08J 2383/04
See application file for complete search history.

(56) References Cited

U.S. PATENT DOCUMENTS

| 2009/0104401 A1* | 4/2009 | Nakanishi | C08G 77/04 |
| | | | 521/64 |
| 2014/0076070 A1* | 3/2014 | Nakanishi | B01J 20/264 |
| | | | 73/863.23 |
| 2017/0081201 A1 | 3/2017 | Kugimiya et al. | |

FOREIGN PATENT DOCUMENTS

| CN | 108002749 A | 5/2018 |
| JP | 5250900 B2 | 7/2013 |
| WO | 2015/177954 A1 | 11/2015 |

OTHER PUBLICATIONS

Wang, Z., Dai, Z., Wu, J., Zhao, N. and Xu, J. (2013), Vacuum-Dried Robust Bridged Silsesquioxane Aerogels. Adv. Mater., 25: 4494-4497. https://doi.org/10.1002/adma.201301617 (Year: 2013).*

(Continued)

*Primary Examiner* — Michael M Dollinger
*Assistant Examiner* — Christina H. W. Rosebach
(74) *Attorney, Agent, or Firm* — Maier & Maier, PLLC

(57) ABSTRACT

An aerogel and drying method, the aerogel having a larger size, good productivity, and high transparency. The aerogel has a silsesquioxane structure and exhibits two exothermic peaks observed in a temperature range of 300 to 600° C. as measured by TG-DTA (thermogravimetry-differential thermal analysis) under an inert gas atmosphere containing 80% by volume of an inert gas and 20% by volume of oxygen. A method for producing aerogel includes a drying step including a first step in which an aerogel which has undergone condensation of a hydrolysate is placed in a liquid phase system having a first liquid phase and a second liquid phase; a second step in which a first solvent constituting the first liquid phase is evaporated from the first liquid phase at a temperature greater than room temperature; and a third step in which heating is still continued after the first liquid phase is evaporated off.

1 Claim, 9 Drawing Sheets

(52) U.S. Cl.
CPC ............... *C08J 2201/0502* (2013.01); *C08J 2201/0546* (2013.01); *C08J 2205/026* (2013.01); *C08J 2383/04* (2013.01)

(56) References Cited

OTHER PUBLICATIONS

Xiaodong Wu; Maohong Fan; Xiaodong Shen; Sheng Cui; Gang Tan. Silica aerogels formed from soluble silicates and methyl trimethoxysilane (MTMS) using CO2 gas as a gelation agent. Ceramics International 44 (2018) 821-829 (Year: 2018).*
Wagner, Matthias. (2018). Thermal Analysis in Practice—Fundamental Aspects. Hanser Publishers. Retrieved from https://app.knovel.com/hotlink/toc/id:kpTAPFA001/thermal-analysis-in-practice/thermal-analysis-in-practice. Chapter 10—Thermogravimetric Analysis. (Year: 2018).*
Wagner, Matthias. (2018). Thermal Analysis in Practice—Fundamental Aspects. Hanser Publishers. Retrieved from https://app.knovel.com/hotlink/toc/id:kpTAPFA001/thermal-analysis-in-practice/thermal-analysis-in-practice. Chapter 1—Introduction to Thermal Analysis. (Year: 2018).*
Baney, R.H.; Itoh, M.; Sakakibara, A.; Suzuki, T. Silsesquioxanes. Chem. Rev. 1995, 1409-1430. (Year: 1995).*
Examination Report dated Sep. 10, 2019 of corresponding Japanese application No. 2019-148498; 9 pgs.
Huijun Yu et al., "Preparation and characterization of hydrophobic silica aerogel sphere products by co-precursor method", Solid State Sciences, 2015, 48, p. 155-162, 8 pgs.
Guo-you Wu et al., "A Novel Route for Preparation of Transparent and Superhydrophobic Silica Aerogels", Mater. Res. Soc. Symp. Proc., 2010, 1234, p. 57-62, 6 pgs.
A. Venkateswara Rao et al., "Superhydrophobic silica aerogels based on methyltrimethoxysilane precursor", Journal of Non-Crystalline Solids, 2003, 330, p. 187-195, 9 pgs.
Ana-Maria Putz et al., "Mesoporous silica obtained with methyltriethoxysilane as co-precursor in alkaline medium" Applied Surface Science, 2017, 424, p. 275-281, 7 pgs.
Digambar Y. Nadargi et al., "Methyltriethoxysilane: New precursor for synthesizing silica aerogels" Journal of Alloys and Compounds, 2009, 467, p. 397-404, 8 pgs.
Sharad D. Bhagat et al., "Methyltrimethoxysilane based monolithic silica aerogels via ambient pressure drying", Microporous and Mesoporous Materials, 2007, 100, p. 350-355, 6 pgs.
Xiaodong Wu et al., "Silica aerogels formed from soluble silicates and methyl trimethoxysilane (MTMS) using CO2 gas as a gelation agent", Ceramics International, 2018, 44, p. 821-829, 9 pgs.
Decision to Grant a Patent dated Feb. 18, 2020 of corresponding Japanese application No. 2019-148498; 6 pgs.
Hayase et al., "New flexible aerogels and xerogels derived from methyltrimethoxysilane/dimethyldimethoxysilane co-precursors", Journal of Materials Chemistry, vol. 21, No. 43, Jan. 1, 2011, 3 pages.
Hayase et al., "Facile Synthesis of Marshmallow-like Macroporous Gels Usable under Harsh Conditions for the Separation of Oil and Water", Angewandte Chemie International Edition, vol. 52, No. 7, Jan. 10, 2013, 4 pages.
Lei et al., "A Co-Precursor Approach Coupled with a Supercritical Modification Method for Constructing Highly Transparent and Superhydrophobic Polymethylsilsesquioxane Aerogels", Molecules, vol. 23, No. 797, Mar. 30, 2018, 10 pages.

* cited by examiner

AEROGEL AND PRODUCTION METHOD OF AEROGEL

FIELD

The present invention relates to a novel aerogel and a method for producing the aerogel, and in more detail, a production method including a novel method for drying the aerogel.

BACKGROUND

Dried gel having a siloxane bond, which is conventionally called an aerogel, has been known (see Japanese Patent No. 5250900). Specifically, the aerogel (dried gel) having many pores is obtained by hydrolyzing a silane compound monomer solution (solvent: water and/or an organic solvent) to form a sol, subjecting the sol to a condensation reaction to form a gel (condensation compound), and then drying the gel.

Here, the pores that the aerogel has are those having a pore size equal to or less than Mean Free Path (MFP) at atmospheric pressure of, for example, element molecules constituting air. Therefore, since there is almost no heat exchange with air in the interior of the aerogel, the aerogel has an excellent potential as a heat insulating material and heat insulating effect of the aerogel is said to be next to that of a vacuum.

Meanwhile, since the aerogel is very brittle, difficult to handle, and tends to be broken in a drying step, which is a final step of production steps, by capillary force caused by surface tension of water used in the production steps, there have been proposed supercritical drying, freeze drying, drying at atmospheric pressure with solvent exchange, and the like.

SUMMARY

However, it cannot be said that satisfactory productivity has been obtained in the drying methods from the viewpoints of yield and increase in size of the aerogel.

An object of the present invention is to provide a novel aerogel having a larger size, good productivity such as high production stability (for example, high yield) and high transparency; and a method for producing the aerogel including a method for drying the aerogel.

Means for Solving the Problems

The object of the present invention has been achieved with the following.

(1) An aerogel having: a silsesquioxane structure; the aerogel exhibiting two exothermic peaks observed in a temperature range of 300 to 600° C. as measured by TG-DTA under an inert gas atmosphere containing 20% by volume of oxygen.

(2) The aerogel according to (1), in which a silsesquioxane fragment is observed in a degradant at a temperature at which the two exothermic peaks are observed as measured by GC-MS.

(3) A method for producing an aerogel including:
a drying step including at least:
1) a first step in which an undried aerogel which has undergone condensation of a hydrolysate is placed in a liquid phase system having a first liquid phase and a second liquid phase;
2) a second step in which a first solvent constituting the first liquid phase is evaporated from the first liquid phase at a first temperature higher than room temperature; and
3) a third step in which the undried aerogel is low-temperature dried until the undried aerogel floats on a liquid surface of the second liquid phase while still maintaining the first temperature after the first liquid phase is evaporated off, the first solvent having a specific gravity and a boiling point lower than those of a second solvent constituting the second liquid phase, and an affinity for the aerogel.

(4) The method for producing an aerogel according to (3), in which the first liquid phase constituting the liquid phase system is in contact with a gas phase having a relative humidity of 50% RH or more.

(5) The method for producing an aerogel according to (3) or (4), further including, after the third step, a fourth step in which the aerogel is removed from the liquid phase system and high-temperature dried at a second temperature higher than the first temperature.

Effects of the Invention

According to the present invention, a novel aerogel having a larger size and high productivity such as high yield; and a method for producing the aerogel including a method for drying the aerogel can be provided.

DETAILED DESCRIPTION OF THE EMBODIMENTS

Embodiments of the present invention will now be described.

<Aerogel>

An aerogel of the present invention is characterized by having a silsesquioxane structure, and exhibiting two exothermic peaks observed in a temperature range of higher than 400° C. to 600° C. as measured by TG-DTA under an inert gas atmosphere containing 20% by volume of oxygen, and by having no exothermic peaks derived from the silsesquioxane structure in a temperature range of 300 to 400° C. The inert gas is preferably He, N2, or Ar.

«TG-DTA Analysis»

Figure 1:
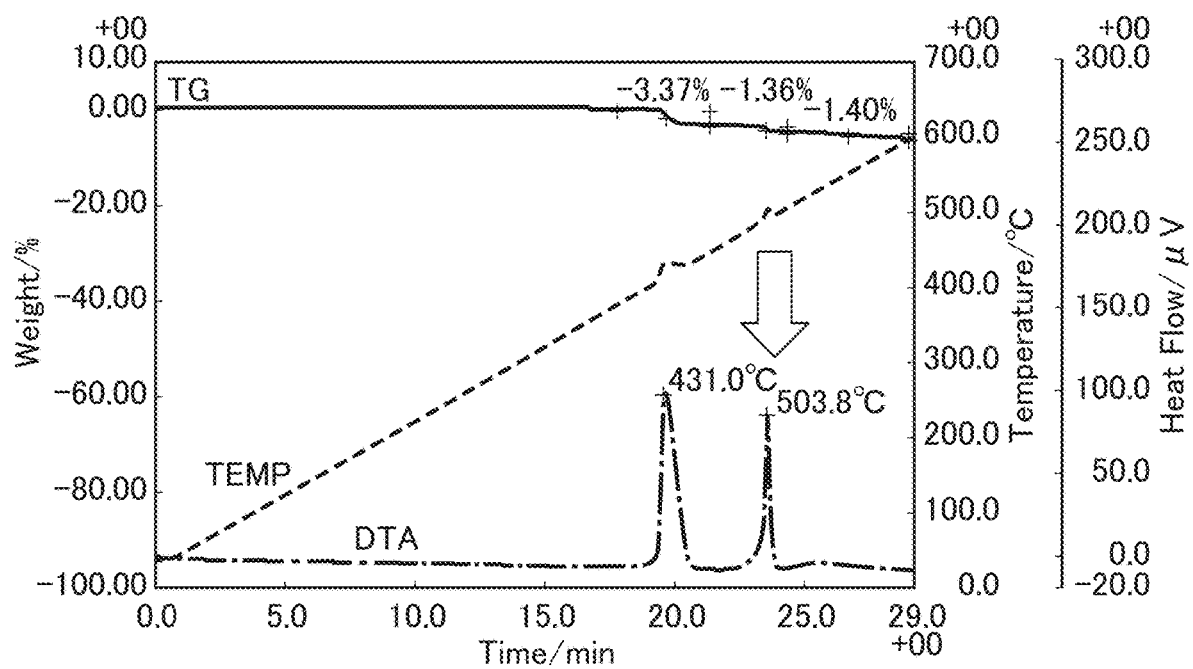
FIG. 1 illustrates TG-DTA measurement data of an aerogel of the present invention.
Figure 2:
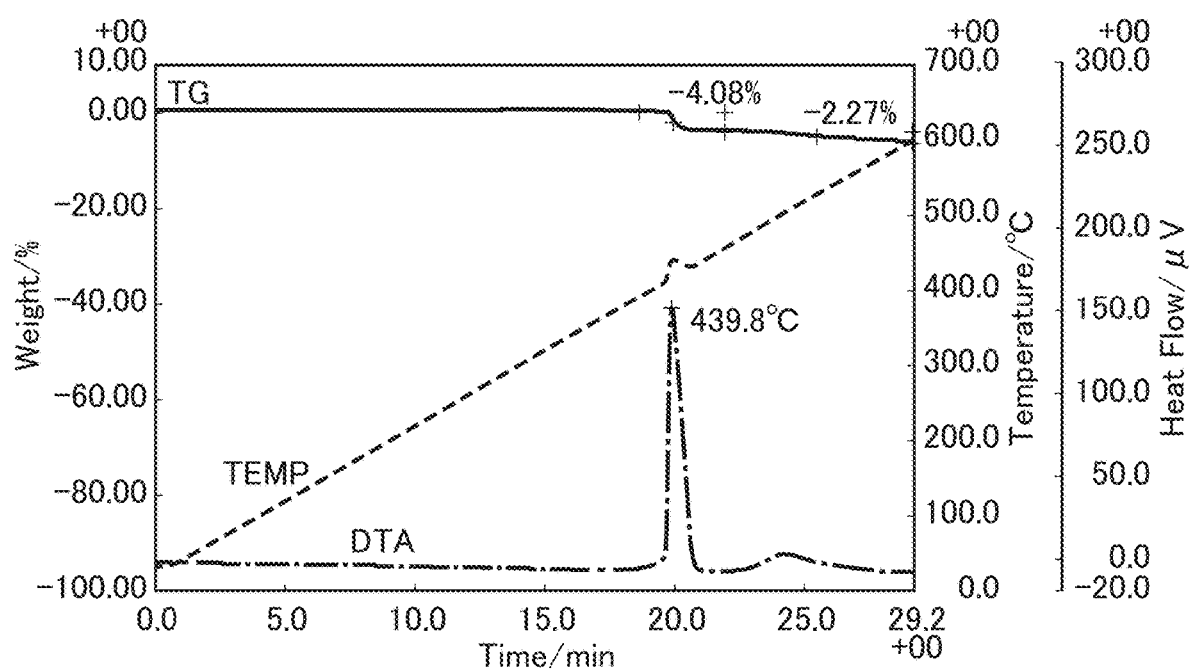
FIG. 2 illustrates TG-DTA measurement data of an aerogel which has been dried under a comparative condition (Reference Document 1, the same applies hereafter)

FIG. 1 illustrates TG-DTA (thermogravimetry-differential thermal analysis) measurement data of an aerogel of the present invention (measured in a mixed gas of 80% by volume of helium (He) gas and 20% by volume of oxygen ($O_2$) gas, and FIG. 2 illustrates TG-DTA measurement data of an existing comparative aerogel described in Reference Document 1 (in a mixed gas of 80% by volume of helium (He) gas and 20% by volume of oxygen (02) gas.

As used herein, a TG-DTA (thermogravimeter-differential thermal analyzer) device refers to a device which performs thermogravimetry and a differential thermal analysis simultaneously. For three different lines illustrated in FIGS. 1 and 2, a solid line represents a plot of change in weight "Weight/%" as measured by thermogravimetry (TG), a dashed line represents a plot of difference in temperature "Temperature/° C." of a measured substance versus a reference substance when heating at a constant heating rate, and a long dashed short dashed line represents a plot of a DTA curve represented by differential calorific value "Heat Flow/µV". A measurement device and measurement conditions are as follows.

(TG-DTA Device)
Differential thermo-balance RIGAKU THERMO PLUS EV02 (manufactured by Rigaku Corporation)
(Measurement Conditions)
<Sample amount> 4.370 mg (FIG. 1), 4.380 mg (FIG. 2)
<Atmosphere Conditions>
Atmosphere gas: mixed gas of 80% by volume of He and 20% by volume of oxygen
Flow rate: 200 ml/min (for the purpose of preventing residual air from entering GC-MS from a balance section, the gas was introduced at 300 ml/min and discharged from a balance side at 100 ml/min)
<Heating conditions> Temperature range: 25 to 600° C., Heating rate: 20° C./min
<Sample container> Platinum (Pt)
<Standard substances> In (156.6° C.), Pb (327.5° C.), Al (660.3° C.) MS measurement was simultaneously performed in connection to the following GC-MS (gas chromatography mass spectrometer).
(Name of GC-MS Measurement Device)
Gas chromatography-mass spectrometer: AGILENT 7890B/5977B (manufactured by Agilent Technologies)
Interface for introducing generated gas for TG-DTA: MAFF-IF/D
(Measurement Conditions)
<Ionization method> EI
<Measurement method> SCAN
<Mass number range> m/z: 10 to 1000
<GC oven temperature> 300° C.

As can be seen from comparison of TG-DTA measurement data illustrated in FIGS. 1 and 2, the aerogel of the present invention has another exothermic peak at a higher temperature side compared to the comparative aerogel (peak indicated by an arrow: 503.8° C.). The exothermic peak at a higher temperature side is observed in a range of +20° C. to +120° C. relative to an exothermic peak at a lower temperature side. It was confirmed by GC-MS that a silsesquioxane fragment (m/z=252) was included in a degradant at the two exothermic peaks (see, FIGS. 3 and 4, it is noted that a vertical axis represents relative intensity).

It can be seen from data in FIGS. 1 and 2 that the aerogel of the present invention is decreased in weight to the same or slightly lesser extent than that of the comparative aerogel. It is noted that the peak at m/z=252 was determined to correspond to the silsesquioxane fragment by comparison with NIST library (National Institute of Standards and Technology mass spectral reference library).

From the above, it can be seen that the aerogel of the present invention has a highly thermostable silsesquioxane-derived structure that the comparative aerogel does not have.

Although details of the highly thermostable silsesquioxane-derived structure are still unknown, the physical strength of a bulk aerogel has increased, allowing for an increase in yield in production and an increase in size.

«Internal Structure of Aerogel»

The aerogel of the present invention has the below-described structures, in addition to the structure revealed by the TG-DTA analysis. Aerogel constituting the aerogel of the present invention is mainly constituted by a bulk portion (gel backbone) filled with solids and a through-hole through the bulk portion like a three-dimensional mesh when its structure is microscopically observed, and a three-dimensional network is formed as a whole.

It is noted that the three-dimensional network of the present invention was determined based on a state observed by a scanning electron microscope and that a diameter of the through-hole in a three-dimensional mesh structure and a cross sectional area of the gel backbone was calculated by measuring a central fine pore size of a continuous through-hole (fine pore) like the three-dimensional mesh, a diameter when a cross section of the backbone was considered as a circle, as well as density and porosity measured by a mercury penetration method.

The bulk portion is constituted by a continuum in which solids form a three-dimensional network with siloxane bonds. The three-dimensional network has 2 nm or more and 25 nm or less of an average length on a side when a lattice, which is a minimum unit of the network, is approximated as cube. It is noted that the average length on a side is preferably 2 nm or more, 5 nm or more, 7 nm or more, 10 nm or more and 25 nm or less, 20 nm or less, 15 nm or less.

Furthermore, the through-hole (fine pore) is in a form of a tube through the bulk portion and has an average internal diameter of 5 nm or more and 100 nm or less when the fine pore is approximated as a tube and the internal diameter of the tube is approximated as a circle. It is noted that the average internal diameter of the fine pore is preferably 5 nm or more, 7 nm or more, 10 nm or more, 20 nm or more, 30 nm or more, 50 nm or more and 100 nm or less, 90 nm or less, 80 nm or less, 70 nm or less. Here, the average internal diameter of the tube has a dimension equal to or less than the mean free path (MFP) at atmospheric pressure of element molecules constituting air.

Furthermore, porosity of the aerogel, that is, a rate of a pore volume of a through-hole (fine pore) relative to a total volume of the aerogel, is 70% or more. One example of the porosity may be 75% or more, 80% or more, 85% or more, 90% or more.

It is noted that the aerogel of the present invention may have a structure other than the above-mentioned bulk portion and through-hole (fine pore) as long as the aerogel satisfies the below-mentioned physical properties. As one example, the aerogel may have space (void) different from the above-mentioned through-hole (fine pore).

As another example, the aerogel may include water, an organic solvent, a surfactant, a catalyst, and degradants thereof, which remain as unavoidable ingredients in production, as long as it satisfies the below-mentioned physical properties. As still another example, the aerogel may include dust, which comes from a production space or a production device, as an unavoidable ingredient in production, as long as the aerogel satisfies the below-mentioned physical properties.

The aerogel of the present invention may also include ingredients which are added with the intention to impart functionality, improve appearance, and impart decorativeness, in addition to the above-mentioned composition. For example, the aerogel may include an antistatic agent, a lubricant, an inorganic pigment, an organic pigment, an inorganic dye, an organic dye.

«Size of Aerogel»

The aerogel of the present invention is not limited in shape or size, however, for example, when the aerogel is applied in applications in which the aerogel needs to have a large area such as a heat insulating material for buildings, the aerogel is preferably formed into a plate, sheet, or film having a large area of 400 cm$^2$ or more.

«Density of Aerogel»

The aerogel of the present invention may have a low density of 0.15 g/cm$^3$ or less. Here, the density is determined by a mercury penetration method. The lower the density of the aerogel is, the lower the thermal conductivity of the aerogel is, and, accordingly, a heat insulating property of the aerogel is improved. Since the aerogel of the present invention has the density of 0.15 g/cm$^3$ or less, the thermal conductivity is low, that is, 0.01 W/m·K or less.

<Production of Aerogel: Raw Material>

The aerogel and a production method thereof except for a drying step in the present invention will now be specifically described.

«Silane Compound as Raw Material»

For a silane compound used for the aerogel of the present invention, at least a bifunctional silane compound and a trifunctional silane compound are preferably mixed at a predetermined ratio (% by mass) and, in particular, the aerogel may be imparted with flexibility by using the trifunctional silane compound as an essential ingredient. Moreover, an aerogel which has less defects such as a crack and a lower density can be produced by including a tetrafunctional silane compound.

In the aerogel of the present invention, when percentages by mass of the bifunctional silane compound and the trifunctional silane compound are represented as Dx and Tx, respectively, they may condense at a mass ratio of Dx:Tx=0:100 to 30:70, preferably, 5:95 to 25:75. The tetrafunctional silane compound may be preferably contained at 0 to 50% by mass relative to the total mass of the silane compound.

Moreover, the silane compound includes at least the trifunctional silane compound among the bifunctional silane compound, the trifunctional silane compound, and the tetrafunctional silane compound, more specifically, when percentages by mass of the bifunctional silane compound, the trifunctional silane compound, and the tetrafunctional silane compound are represented as Dx, Tx, and Qx, respectively, at least the bifunctional silane compound and the trifunctional silane compound are mixed at a ratio satisfying 0≤Dx<30, 50≤Tx<100, 0≤Qx<50, and Dx+Tx+Qx=100.

As used herein, the bifunctional silane compound refers to a silane compound having two siloxane bonds, the trifunctional silane compound refers to a silane compound having three siloxane bonds, and the tetrafunctional silane compound refers to a silane compound having four siloxane bonds.

Examples of the bifunctional silane compound include dialkoxysilane and diacetoxysilane. A desired embodiment of the dialkoxysilane includes an alkoxy group containing 1 to 9 carbon atoms. Specific examples thereof include dimethyldimethoxysilane, diethyldimethoxysilane, and diisobutyldimethoxysilane. These compounds may be used singly, or a plurality of the compounds may be used in combination. In the present invention, dimethyldimethoxysilane (DMDMS) is particularly preferably used as the bifunctional silane compound.

Examples of the trifunctional silane compound include trialkoxysilane and triacetoxysilane. A desired embodiment of the trialkoxysilane includes an alkoxy group containing 1 to 9 carbon atoms. Examples thereof include methyltrimethoxysilane, ethyltrimethoxysilane, propyltrimethoxysilane, hexyltrimethoxysilane, octyltrimethoxysilane, methyltriethoxysilane, ethyltriethoxysilane, propyltriethoxysilane, pentyltriethoxysilane, hexyltriethoxysilane, and octyltriethoxysilane. These compounds may be used singly, or a plurality of the compounds may be used in combination. In the present invention, methyltrimethoxysilane (MTMS) is preferably used as the trifunctional silane compound.

Examples of the tetrafunctional silane compound include tetraalkoxysilane and tetraacetoxysilane. A desired embodiment of the tetraalkoxysilane includes an alkoxy group containing 1 to 9 carbon atoms. Examples thereof include tetramethoxysilane, tetraethoxysilane, tetrapropoxysilane, and tetraisopropoxysilane. These silane compounds may be used singly, or a plurality of the silane compounds may be used in combination. In the present invention, tetramethoxysilane (TMOS) is preferably used as the tetrafunctional silane compound.

«Sol Production Step»

A sol for producing the aerogel of the present invention is produced in a step including a sol production step in which various raw materials including a silane compound (main raw material) are added to a predetermined solution, and stirred and mixed together.

«Auxiliary Material and Sol Production Condition in Sol Production Step»

In the sol production step, the bifunctional silane compound, the trifunctional silane compound, and optionally the tetrafunctional silane compound serving as main raw materials are mixed at the above-mentioned predetermined mixing ratio and a solution containing water and a surfactant is prepared. This preparation results in hydrolysis of the silane compounds, producing a sol having a siloxane bond. It is noted that an acid and/or an organic solvent may be included in the solution to be prepared.

The surfactant contributes to formation of a bulk portion and a pore portion constituting the below-mentioned aerogel in the below-mentioned gel production process. As the surfactant capable of being used for producing the aerogel, a non-ionic surfactant, an ionic surfactant, or the like may be used. Examples of the ionic surfactant may include a cationic surfactant, an anionic surfactant, an amphoteric surfactant, and the like.

Among these, the non-ionic surfactant may be preferably used. An amount of the surfactant added to the solution to be prepared depends on a type and a mixing ratio of the silane compounds and a type of the surfactant, but may be in a range of 0.001 to 100 parts by mass, preferably in a range of 0.01 to 90 parts by mass, further preferably in a range of 0.1 to 80 parts by mass per 100 parts by mass of the total amount of the silane compounds serving as the main raw materials.

The acid acts as a catalyst upon hydrolysis and can accelerate a reaction rate of the hydrolysis. Specific examples of the acid include an inorganic acid, an organic acid, and an organic acid salt.

Examples of the inorganic acid include hydrochloric acid, sulfuric acid, sulfurous acid, nitric acid, fluorinated acid, phosphoric acid, phosphorous acid, hypophosphorous acid, bromic acid, chloric acid, chlorous acid, and hypochlorous acid.

Examples of the organic acid include carboxylic acids such as acetic acid, formic acid, propionic acid, oxalic acid, malonic acid, succinic acid, citric acid, malic acid, adipic acid, azelaic acid, and the like.

As the organic acid salt, acidic aluminum phosphate, acidic magnesium phosphate, acidic zinc phosphate, and the like may be used. These acids may be used singly, or a mixture of two or more types thereof may be used. In the present invention, acetic acid which is the organic acid is preferably used as the acid.

Furthermore, a concentration of the acid added to a total of the solution to be prepared may be in a range of 0.0001 mol/L to 0.1 mol/L, in particular, preferably in a range of 0.0005 mol/L to 0.05 mol/L, further preferably in a range of 0.001 mol/L to 0.01 mol/L.

As the organic solvent, alcohols such as methanol, ethanol, n-propanol, 2-propanol, n-butanol, 2-butanol, t-butanol, and the like may be used. These may be used singly, or a mixture of two or more types thereof may be used. Furthermore, an amount of the organic solvent added to the solution to be prepared is in a range of 4 mol to 10 mol, in particular, preferably 4.5 mol to 9 mol, especially suitably 5 mol to 8 mol per 1 mol of the total amount the silane compounds serving as the main raw materials from the viewpoint of compatibility.

A solution temperature and time needed for the sol production step depend on types and amounts of the silane compounds, the surfactant, the water, the acid, a nitrogen compound, the organic solvent, and the like in a mixed solution, but may be, for example, in a range of 0.05 hours to 48 hours under a temperature environment of 0° C. to 70° C., preferably treatment is performed for 0.1 hours to 24 hours under a temperature environment of 20 to 50° C. This results in hydrolysis of the silane compounds, forming colloids and thus producing a liquid sol as a whole.

It is noted that an auxiliary material and/or a degradant of the auxiliary material used in the sol production step may be incorporated into the produced aerogel as an unavoidable ingredient.

«Wet Gel Production and Molding Step (Curing Step)»

A wet gel production and molding step can be broadly classified into a step of adding a basic catalyst to the liquid sol produced in the above-mentioned sol production step, a step of pouring a solution which includes the added basic catalyst into a mold for obtaining a desired shape, and a step of curing the solution within the mold to thereby produce a wet gel.

Examples of the basic catalyst include ammonium compounds such as ammonium hydroxide, ammonium fluoride, ammonium chloride, ammonium bromide, and the like; alkali metal hydroxides such as lithium hydroxide, sodium hydroxide, potassium hydroxide, cesium hydroxide, and the like; basic sodium phosphate such as sodium metaphosphate, sodium pyrophosphate, sodium polyphosphate, and the like; fatty amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, triethanolamine, and the like; nitrogen-containing heterocyclic compounds such as morpholine, N-methylmorpholine, 2-methylmorpholine, piperazine and derivatives thereof, piperidine and derivatives thereof, imidazole and derivatives thereof, and the like. The basic catalyst may be used singly, or a mixture of two or more types thereof may be used.

The basic catalyst may be a nitrogen compound which generates the basic catalyst upon heating. The nitrogen compound is added as a compound which generates the basic catalyst upon heating during the wet gel production and molding step. Specific examples thereof include urea, amide compounds such as formamide, N-methylformamide, N,N-dimethylformamide, acetamide, N-methylacetamide, N,N-dimethylacetamide, and the like; heterocyclic compounds such as hexamethylenetetramine, and the like. Among these, urea may be suitably used in the wet gel production step from the viewpoint of accelerating a producing rate.

An amount of addition of the basic catalyst is preferably 0.5 to 5 parts by mass, particularly suitably 1 to 4 parts by mass per 100 parts by mass of the total amount of the main raw materials. When the amount is less than 0.5 parts by mass, a reaction for the conversion from the sol to the wet gel cannot progress, on the other hand, when the amount is greater than 5 parts by mass, the reaction progresses too fast, potentially resulting in overall non-uniformity within the mold.

Among these, an ammonium hydroxide aqueous solution is preferable from the viewpoints of a high reaction acceleration effect as a catalyst, and a possibility of formation of the wet gel from the sol in a short time and with less defects. The ammonium hydroxide aqueous solution is also excellent because it volatilizes in the below-mentioned solvent exchange step and drying step due to its high volatility and thus is less likely to remain in the aerogel.

An amount of addition in the case of the nitrogen compound is not particularly limited, but, for example, the nitrogen compound is added in a range of preferably 1 to 200 parts by mass, more suitably 2 to 150 parts by mass per 100 parts by mass of the total amount of the silane compounds serving as the main raw materials.

The step of pouring a solution which includes the added basic catalyst into a mold is a step for the purpose of obtaining an aerogel product having a desired shape. The mold may be made using any of metal, synthetic resin, wood, or paper, but the synthetic resin may be suitably used from the viewpoint of achieving both planarity in shape and releasability. Examples of the synthetic resin may include polystyrene, polyethylene, and polypropylene.

The mold is for obtaining a desired shape of the aerogel product, so the mold has a shape reflecting a shape in which concave and convex portions of the aerogel product having a desired shape are inverted. For example, when the desired shape of the aerogel product is plate-like (cuboid), a concave tray of which one end is open may be used as the mold.

Furthermore, the mold may be a combination mold formed of a plurality of molds like a so-called mold for injection molding. One example thereof includes a two-combination mold using a concave mold and a convex mold which are opposite to each other, and a combination mold in which an inner surface of a concave mold and an outer surface of a convex mold are spaced apart by a predetermined interval may also be used. As a result, the solution (solution composed of the sol and the basic catalyst) may be poured into an internal space of the combination mold and sealed for a predetermined period of time.

Furthermore, when the concave tray of which one end is open is used as the mold, a flat plate (plate) covering an entire open (flat) surface of the concave tray may be prepared as a second mold and used as a two-combination mold so as to be opposite to the open surface of the concave tray. As a result, the solution (solution composed of the sol and the basic catalyst) may be poured into an inside of the combination mold and sealed for a predetermined period of time.

Following a step of filling the mold with the solution including the added basic catalyst, a molding step of curing the solution within the mold is performed to thereby produce a wet gel and shape the wet gel into a shape corresponding to an internal wall of the mold.

The curing allows a reaction for the conversion from the sol to the wet gel to progress by applying a predetermined energy for a predetermined period of time. One example of the energy includes heat (temperature), and heating at 30 to 90° C., desirably 40 to 80° C. is used. The heating may be heater heating or steam heating with water or an organic solvent.

Furthermore, other examples of the energy include application of electromagnetic waves such as infra-red rays, ultraviolet rays, microwaves, gamma-rays, and the like; and application of electron rays. These energies may be used singly or a plurality of means may be used in combination.

Time required for curing depends on composition of the silane compounds, types and amounts of the surfactant, the water, the acid, the nitrogen compound, the organic solvent, the basic catalyst, and the like, and a type and density of the energy, but is 0.01 hours to 7 days. When types of the basic catalyst and the energy are optimized, gelation may be completed for 0.01 hours to 24 hours. The curing may also be curing in which heat (temperature) and time are varied in stages. It is noted that materials and/or degradants of the materials used in the wet gel production and molding step may be incorporated into the produced aerogel as unavoidable ingredients.

«Solvent Exchange Step»

A solvent exchange step is a step of exchanging the water and/or the organic solvent being present on a surface and in an inside of the wet gel with an organic solvent suitable for drying in a short time, but may be omitted when it does not matter if the subsequent drying step takes a long time. Furthermore, the solvent exchange step may be performed after the wet gel is removed from the above-mentioned mold or alternatively within the mold.

Furthermore, prior to the solvent exchange step, a washing treatment may be performed in which the acid used in production of the sol, the catalyst used in production of the wet gel, a reaction by-product, and the like may be washed away. For the washing treatment, a variety of organic solvents may be used. For example, various organic solvents such as methyl alcohol, ethyl alcohol, n-propyl alcohol, isopropyl alcohol, 1-butanol, acetone, methyl ethyl ketone, methyl isobutyl ketone, xylene, 1,2-dimethoxyethane, acetonitrile, hexane, toluene, diethylether, chloroform, ethyl acetate, tetrahydrofuran, methylene chloride, N,N-dimethylformamide, dimethyl sulfoxide, acetic acid, formic acid, and the like may be used. The above-mentioned organic solvents may be used singly, or a mixture of two or more types thereof may be used.

Among these, methyl alcohol, ethyl alcohol, isopropyl alcohol, acetone, methyl ethyl ketone, and the like, which are soluble in both the water and the organic solvent, may be used singly or a mixture of two or more types thereof may be used.

In the solvent exchange step, in order to suppress damage due to gel shrinking in the subsequent drying step, the water (or the organic solvent) on the surface or in the inside of the wet gel is replaced with an organic solvent having a surface tension at 20° C. of 45 mN/m or less. For example, examples thereof include dimethyl sulfoxide (43.5 mN/m), cyclohexane (25.2 mN/m), isopropyl alcohol (21 mN/m), heptane (20.2 mN/m), pentane (15.5 mN/m), and the like.

The organic solvent used in the solvent exchange step may have a surface tension at 20° C. of 45 mN/m or less, 40 mN/m or less, 35 mN/m or less, 30 mN/m or less, 25 mN/m or less, 20 mN/m or less, or 15 mN/m or less and 5 mN/m or more, 10 mN/m or more, 15 mN/m or more, or 20 mN/m or more. Among these, an organic solvent including an aliphatic hydrocarbon which has a surface tension at 20° C. in a range of 20 to 40 mN/m is suitably used. The organic solvent may be used singly, or a mixture of two or more types thereof may be used.

An amount of the solvent used in the solvent exchange step depends on a temperature and a device (container) for solvent exchange, but is desirably 2 to 100 times a volume of the wet gel. The solvent exchange is not limited to once, and may be performed multiple times. Furthermore, a method of solvent exchange may be any of full replacement, partial replacement, or circulation replacement.

Furthermore, when the solvent exchange is performed multiple times, a type of the organic solvent, a temperature, and a treatment time may be independently set for each time. It is noted that materials and/or degradants of the materials used in the solvent exchange step may be incorporated into the produced aerogel as unavoidable ingredients. The solvent used in the solvent exchange step may be the first solvent constituting the first liquid phase of the present invention.

«Drying Step»

A drying step is the most important step among steps constituting the above-mentioned method for producing the aerogel of the present invention. The drying step is a step of drying the wet gel which has been subjected to the solvent exchange to thereby obtain an aerogel having a predetermined property and is a step characterizing structure of the aerogel of the present invention.

The method for producing an aerogel of the present invention is a method for producing an aerogel including a drying step, the drying step including at least:

1) a first step in which an undried aerogel which has undergone condensation of a hydrolysate is placed in a liquid phase system having a first liquid phase and a second liquid phase;

2) a second step in which a first solvent constituting the first liquid phase is evaporated from the first liquid phase at a first temperature higher than room temperature; and 3) a third step in which the undried aerogel is low-temperature dried until the undried aerogel floats on an interface of the second liquid phase while still maintaining the first temperature after the first liquid phase is evaporated off, the first solvent being characterized by having a specific gravity and a boiling point lower than those of a second solvent constituting the second liquid phase, and an affinity for the aerogel.

«First Step»

Figure 5:
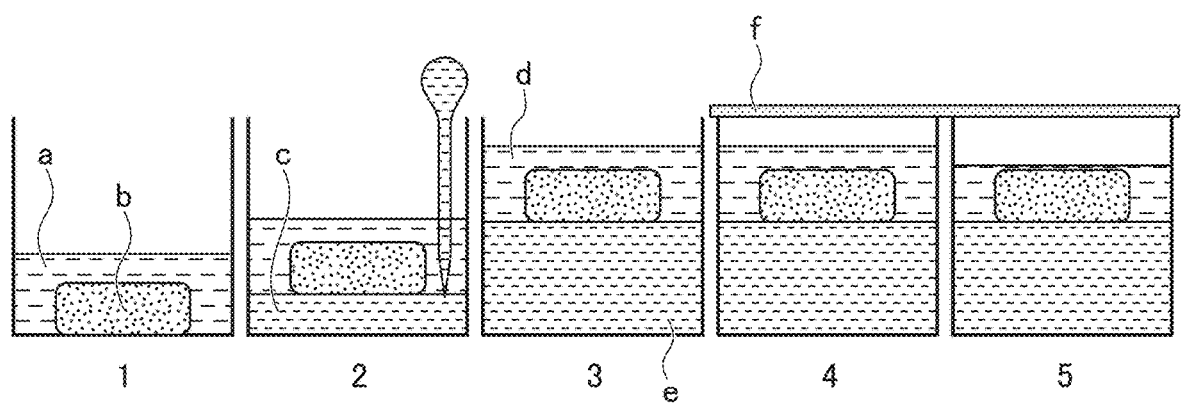
FIG. 5 is a schematic diagram of a drying step of the present invention.
Figure 5:
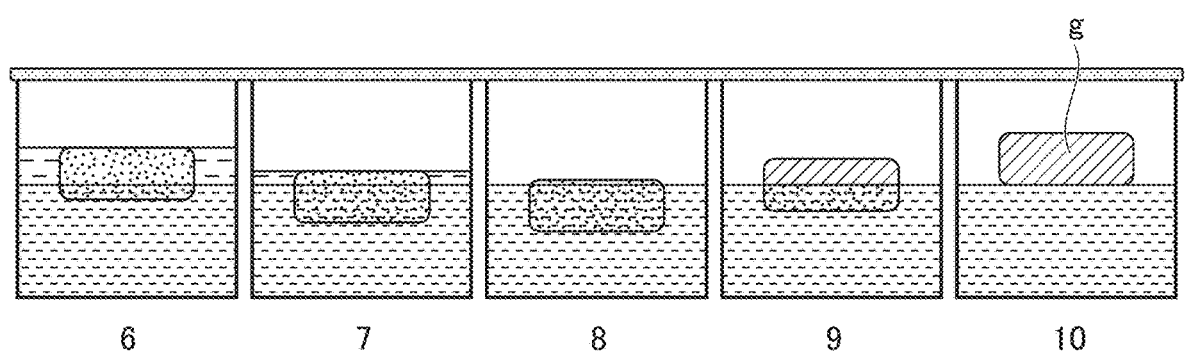

A reference numeral 1 in FIG. 5 represents a state in which an aerogel which has undergone condensation of a hydrolysate (hereinafter may be referred to as an undried aerogel) b is immersed in a first solvent a, and reference numerals 2 to 3 correspond to the first step.

In the first step of the present invention, the undried aerogel b is placed in a liquid system having a first liquid phase d and a second liquid phase e. The liquid phase system forms two phases, the first liquid phase d and the second liquid phase e, and a first solvent a constituting the first liquid phase d and a second solvent c constituting the second liquid phase e are selected from solvents which are not completely mixed and separated into two phases. Since the first solvent a is selected from solvents each having a specific gravity lower than that of the second solvent c, a liquid phase system in which the first liquid phase d is located upper and the second liquid phase e is located lower is formed. A boiling point of the first solvent a is lower than that of the second solvent c.

Furthermore, in the present invention, the undried aerogel b needs to have a property that allows the undried aerogel b to settle down and become immersed in the first liquid phase d. Therefore, the undried aerogel needs to have an affinity for the first solvent and a specific gravity higher than that of the first solvent.

The undried aerogel b which has undergone condensation of a hydrolysate is removed from a reaction system in which condensation has taken place and placed into a liquid phase system which is filled with only the first solvent a of the present invention (1 in FIG. 5).

The first solvent a of the present invention has an affinity for the aerogel. As used herein, the phrase "having an affinity" means that a solvent can enter fine pores of the undried aerogel b and, as a result, the entire aerogel is impregnated with the solvent. For example, the solvent preferably has a dissolution parameter of 7.0 to 9.5.

The first solvent a of the present invention is preferably an organic solvent having a boiling point of 50 to 100° C., and examples thereof include hydrocarbon based solvents such as hexane (specific gravity: 0.65, boiling point: 69° C.) and heptane (specific gravity: 0.68, boiling point: 98° C.); ester based solvents such as methyl acetate (specific gravity: 0.93, boiling point: 57° C.) and ethyl acetate (specific gravity: 0.90, boiling point: 77° C.), and the like.

The second solvent c of the present invention is not particularly limited as long as it is not completely mixed with the first solvent a, can form two liquid phases d and e, and has a boiling point higher than that of the first solvent a, but examples thereof include water (specific gravity: 1.0, boiling point: 100° C.), silicone oil (specific gravity: 0.94 to 0.98, boiling point: 150° C. or more), fluorine based solvents (specific gravity: 1.3 to 1.5, boiling point: 98 to 150° C.), mercury (specific gravity: 13, boiling point: 356° C.), and the like.

For example, when the aerogel is cuboid, a bottom surface of the undried aerogel b is located in the vicinity of an interface between the first liquid phase d and the second liquid phase e, a portion thereof above the bottom surface mostly presents in the first liquid phase d since the aerogel has an affinity for the first solvent a.

The first liquid phase d is preferably formed of the first solvent a in an amount so that the whole of the undried aerogel may be immersed, and the second liquid phase e is preferably formed of the second solvent c in an amount so that almost the whole of the aerogel may be immersed after the first liquid phase d is evaporated off.

A method for placing the undried aerogel b in the liquid phase system is preferably a method in which the undried aerogel b is placed in the first liquid phase d and then the second solvent c is added to thereby form the second liquid phase e, as illustrated in FIG. 5, but is not limited thereto. For example, any of a method in which the first liquid phase d and the second liquid phase e are formed and then the undried aerogel is placed and a method in which the undried aerogel b is placed on the second liquid phase e and then the first solvent a is added to thereby form the first liquid phase d may be employed.

«Second Step»

Reference numerals 4 to 8 in FIG. 5 correspond to the second step. In the second step of the present invention, the first solvent a constituting the first liquid phase d is evaporated from the first liquid phase d at a first temperature higher than room temperature. An atmosphere temperature upon evaporation preferably satisfies room temperature<atmosphere temperature<boiling point. Furthermore, the atmosphere temperature may be a heated temperature. As used herein, the phrase "room temperature" has the same meaning as normal temperature, i.e., 15 to 25° C., and the first temperature is preferably a temperature higher than room temperature, for example, 30 to 50° C. It is not preferable that the first temperature be equal to or higher than a boiling point of the first solvent a since the aerogel collapses.

In the second step, a relative humidity of a gas phase above the first liquid phase d is preferably 50% RH. Further preferably, the relative humidity is 60% RH or higher. When the liquid phase system is an open system for drying, the whole of the liquid phase system is preferably humidity-controlled, and when the liquid phase system is in a dryer, a gas phase may be formed in a form in which the liquid phase system is covered with a breathable film f, as illustrated under a reference numeral 4 in FIG. 5.

Examples of the breathable film f include BREATHRON BRN-3000E1, BRN-9000EB, BRN-1860, BRN-A120E1, SUNMAP LC (breathable sheets and a porous film, all manufactured by Nitto Denko Corporation), cellulosic filter paper having a fine pore size of 0.1 to 100 μm, and the like.

In the second step, the aerogel gradually settles down in the second liquid phase e with a rate of a settled portion of the aerogel being increased, as the first liquid phase d disappears (7 in FIG. 5), the aerogel is almost entirely immersed in the second liquid phase e just before the first liquid phase d completely disappears (reference numeral 8 in FIG. 5). At this time, the aerogel is observed to be in a shrunken state, and, in some cases, is observed to be deformed, that is, convexly curled towards a gas phase side.

In the second liquid phase e, the second solvent c needs to be used in an amount so that a state in which the aerogel during drying is not in contact with a wall surface or a bottom surface of a dryer even when the aerogel is curled can be held.

The first temperature may be adjusted and changed while the second step is continued, and a heating temperature is preferably decreased slightly at the time point when the first liquid phase d is evaporated and thus the aerogel is exposed from an interface between the first liquid phase d and a gas phase. For example, the first temperature may be 40° C. until the aerogel is exposed from the interface and subsequently decreased to 30° C.

«Third Step»

Reference numerals 9 to 10 in FIG. 5 correspond to the third step. The third step of the present invention is a step of low-temperature drying the undried aerogel b until the undried aerogel b floats on a liquid surface of the second liquid phase while still maintaining the first temperature after the first liquid phase d is evaporated off. At the time point when the second step is terminated, the first liquid phase d has disappeared and the aerogel has settled down and moved in the second liquid phase e since the aerogel during drying has a specific gravity higher than that of the second solvent c. In this third step, evaporation is continued in the second liquid phase e, as a result, the aerogel which has shrunken swells and returns to cuboid by springing back.

As an inside of the aerogel gradually dries, the specific gravity of the aerogel decreases, and when the specific gravity is lower than that of the second solvent c, the aerogel begins to move upward from the interface of the second liquid phase e. The third step preferably continues until the return by springing back reaches a steady state. In this state, the aerogel is removed and left in the air to dry naturally. Thus, a dried aerogel of interest can be obtained.

«Fourth Step»

Although the object can be achieved by completing up to the third step of the present invention, a fourth step in which the aerogel is removed from the liquid phase system and high-temperature dried at a second temperature higher than the first temperature is further preferably included after the third step. By further performing the fourth step, an aerogel having high transparency can be obtained.

The second temperature is preferably 50 to 250° C. In the fourth step, a device which is usually called an incubator can be used. Examples of conditions for high-temperature drying include the case in which the second temperature is 50 to 100° C. and a drying time is 5 to 10 hours and the case in which the second temperature is 150 to 250° C. and a drying time is 10 to 90 minutes.

Thus, as a result of undergoing the above-mentioned steps and the drying step, cracking can be suppressed from occurring and an aerogel which has a larger size and high transparency can be produced with high productivity.

<Other Steps>

Although the above-described production method has been described for a method for producing an aerogel in a plate-like (or cuboid) or film-like shape, the present invention is not limited thereto and may include processing the plate-like aerogel into a desired shape as an optional step. For example, the plate-like (or cuboidal) aerogel may be processed into various shapes such as a rectangle, a circular plate or film, a cube, a sphere, a cylinder, a pyramid, a cone, and the like. In the processing method, known machining such as wire cutting or laser cutting may be used.

Furthermore, the aerogel of the present invention may include processing cuboidal aerogel into particulate aerogel as an optional step. In the processing method, a known mill (crusher) such as a jaw crusher, a roll crusher, a ball mill, or the like may be used.

From such advantages, the aerogel of the present embodiment can be applied in applications as heat insulating materials in cryogenic containers, a space field, an architecture field, an automotive field, a household appliance field, a semiconductor field, an industrial facility field, and the like. Furthermore, the aerogel of the present embodiment can be utilized for repelling water, absorbing sound, damping, carrying a catalyst, and the like, in addition to the applications as the heat insulating materials.

EXAMPLES

Examples of the present invention will now be described.
<Production of Undried Aerogel>
First, 3.28 g of a non-ionic surfactant serving as a surfactant (PLURONIC PE9400, manufactured by BASF) was dissolved in 28.96 g of a 0.005 mol/L acetic acid aqueous solution, and then 4.00 g of urea (manufactured by NACALAI TESQUE, INC.) serving as a hydrolyzable compound was added thereto to dissolve. To this aqueous solution, 10.00 g of a silicon compound was added serving as a main raw material, followed by stirring and mixing at room temperature for 60 minutes to thereby hydrolyze the silicon compound. Thus, a sol was produced.

The silicon compound was selected from tetramethoxysilane, a tetrafunctional silane compound (methyl orthosilicate, manufactured by TAMA CHEMICALS CO., LTD., hereinafter may be abbreviated as "TMOS"); methyltrimethoxysilane, a trifunctional silane compound (DOWSIL Z-6366 Silane, manufactured by Dow Corning Toray Co., Ltd., hereinafter may be abbreviated as "MTMS"); and dimethyldimethoxysilane, a bifunctional silane compound (product code:D1052, manufactured by Tokyo Chemical Industry Co., Ltd., hereinafter may be abbreviated as "DMDMS"), and was added in a ratio of 25% by mass of the tetrafunctional silane compound, 65% by mass of the trifunctional silane compound, and 10% by mass of the bifunctional silane compound. It is noted that both TMOS and MTMS were purified with vacuum distillation prior to use.

Thereafter, the thus-produced sol was left at rest in a coin-size container (diameter of upper surface: 39 mm, diameter of lower surface: 37 mm, height: 10 mm) at 60° C. to thereby allow it to gel. Twenty containers were prepared. Thereafter, wet gel was aged by further leaving at rest for 96 hours. Then, the wet gel was removed from a sealed container, and the thus-removed wet gel was immersed in a methanol (MeOH) solution having a volume corresponding to 5 times a volume of the wet gel and subjected to solvent exchange 5 times repeatedly under conditions at 60° C. for 8 hours.

For the subsequent solvent exchange, hexane which had high vapor pressure and needed stricter drying conditions was used. The wet gel was immersed in a IPA/Hex mixed solution which was a mixture of isopropyl alcohol (IPA) and hexane (Hex) at a volume ratio of 1:4 to 1:3 and which had the volume corresponding to 5 times a volume of the wet gel, and subjected to another solvent exchange under conditions at 50° C. for 8 hours, and then, the wet gel was immersed in a hexane solution which had a volume corresponding to 5 times the volume of the wet gel and subjected to further solvent exchange twice repeatedly under conditions at 50° C. for 8 hours. Thus, 20 samples of the undried aerogel which had undergone condensation of a hydrolysate were obtained. It is noted that the methanol and the isopropanol used for the solvent exchange were manufactured by NACALAI TESQUE, INC.

<Example that Drying Method Constituting Production Method of the Present Invention was Applied>

A drying method constituting the production method of the present invention was applied to ten samples of the obtained undried aerogel as follows. This drying method can be performed in a container which is equipped with a heater, of which upper surface is open, and to which liquid is capable of being loaded.

«First Step»

The undried aerogel was placed and immersed in a container filled with a hexane solution, which was a first solvent constituting a first liquid phase, to such an extent that the whole of the aerogel was sufficiently covered, and then water, which was a second solvent constituting a second liquid phase, was added thereto in a volume equal to or more than that of hexane. Thus, the first liquid phase and the second liquid phase were formed. In the container, a liquid phase system, in which hexane (forming the first liquid phase located above) and water (forming the second liquid phase located below) were separated into two liquid phase, was formed and the undried aerogel existed in a settled state in the hexane.

«Second Step»

After the first step, an atmosphere temperature within the container was set to 30° C. (first temperature), and the hexane was allowed to evaporate. At this time, the open upper surface of the container was covered with a sheet of cellulosic filter paper (filter paper, manufactured by WATT MANN CO., LTD., grade 1, particle holding capability: 11 µm) serving as a breathable film, and a humidity in space defined by a liquid surface of the hexane and the breathable film was adjusted to be about 50% RH. The temperature was held at about 30° C. until the hexane was completely removed.

«Third Step»

The undried aerogel was low-temperature dried until the undried aerogel floated on a liquid surface of the second liquid phase while still maintaining the first temperature after the hexane was removed in the second step. The total drying time in the second step and the third step was 48 hours. During drying, the undried aerogel was temporarily settled down and moved in water, but then floated on a liquid surface of the water again. At this time point, the low-temperature drying was terminated and the aerogel was removed from the container.

«Fourth Step»

The aerogel removed from the container was additionally dried in additional incubators at 60° C. for 2 hours (IS601, manufactured by Yamato Scientific Co., Ltd.), at 80° C. for 5 hours (IS601, manufactured by Yamato Scientific Co., Ltd.), and at 250° C. for 30 minutes (DH412, manufactured by Yamato Scientific Co., Ltd.). Thus, the aerogel of the present invention was obtained.

<Comparative Example Employing Existing Drying Method>

For a comparative aerogel, 10 samples of the undried aerogel which were subjected to solvent exchange with hexane were placed into a container (dryer) in which an evaporation rate was capable of being adjusted and dried at 30° C. for 48 hours. Thereafter, it was additionally dried in the same manner as in the fourth step of Example. Thus, a comparative aerogel (Comparative Example) was obtained.

<Evaluation>

«TG-DTA Measurement»

Figure 3:
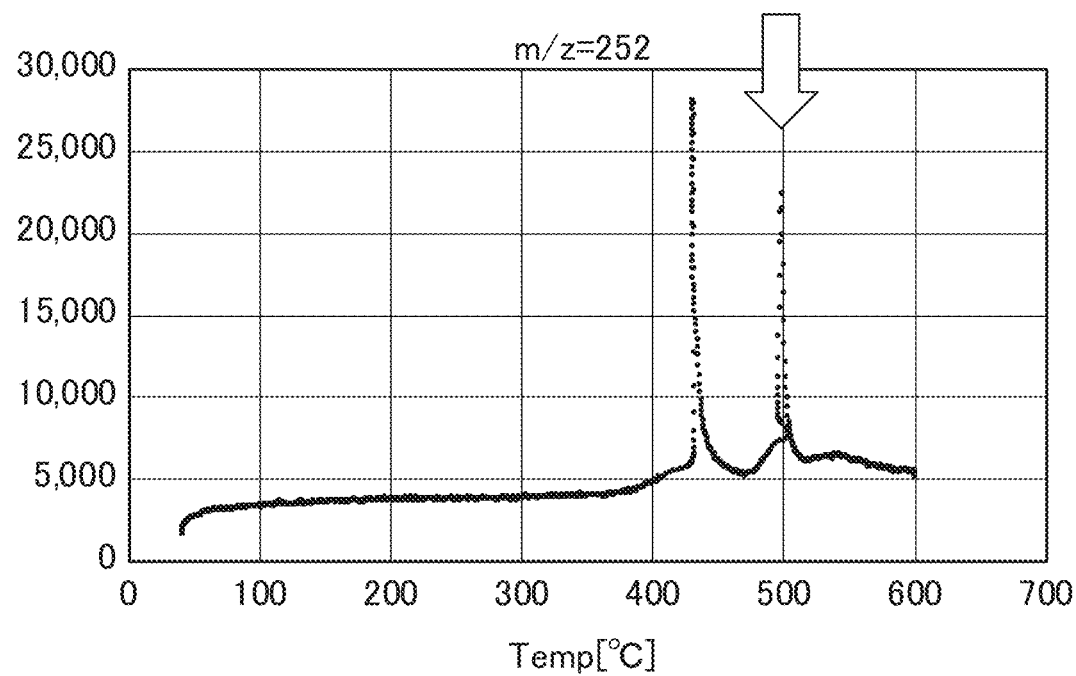
FIG. 3 illustrates GC-MS analytical data in which silsesquioxane is detected, at TG-DTA measurement peaks of the aerogel of the present invention, wherein the y-axis represents intensity of the m/z=252 fragment.
Figure 4:
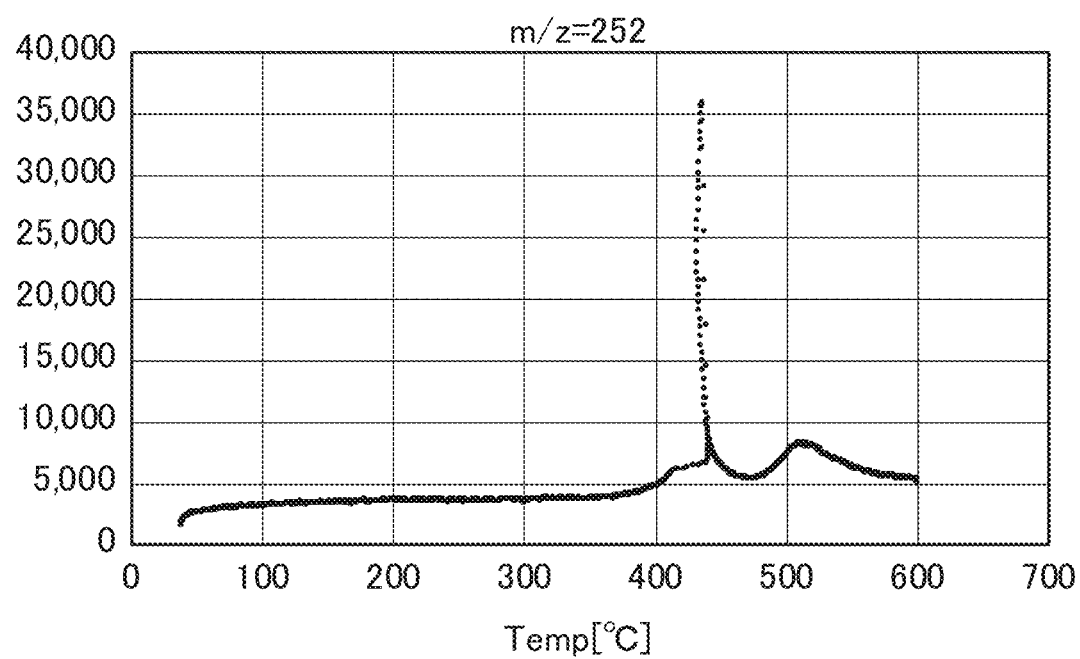
FIG. 4 illustrates GC-MS analytical data in which silsesquioxane is detected, at a TG-DTA measurement peak of the comparative aerogel, wherein the y-axis represents intensity of the m/z=252 fragment.

The aerogel of the present invention (Example) and the comparative aerogel (Comparative Example) were subjected to TG-DTA measurement. As a result, the Example exhibited two peaks in a temperature range of 300 to 600° C., as shown in FIG. 1. Meanwhile, the comparative Example exhibited only one peak in a temperature range of 300 to 600° C., as shown in FIG. 2. Furthermore, the two peaks exhibited in the Example were observed to be both silsesquioxane fragments based on GC-MS measurement (FIG. 3).

This result suggests that the comparative aerogel has a single silsesquioxane structure, on the other hand, the aerogel of the present invention has, in addition to the silsesquioxane structure that the comparative aerogel has, another silsesquioxane structure having a higher thermostability.

«Observation of Crack Occurrence»

Figure 6:
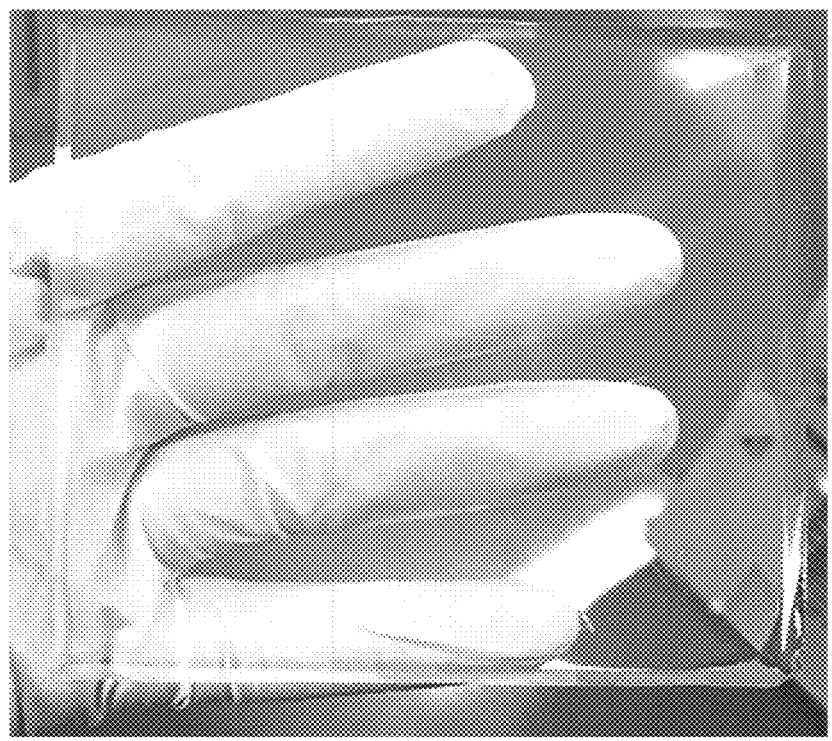
FIG. 6 illustrates aerogel of 10 cm by 10 cm obtained according to the present invention.
Figure 7:
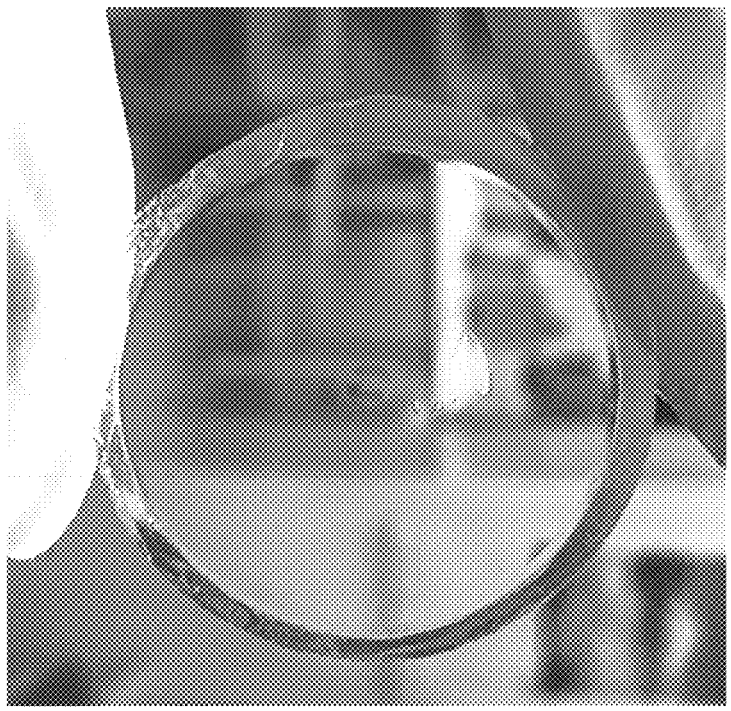
FIG. 7 illustrates aerogel in a coin size obtained according to the present invention.
Figure 8:
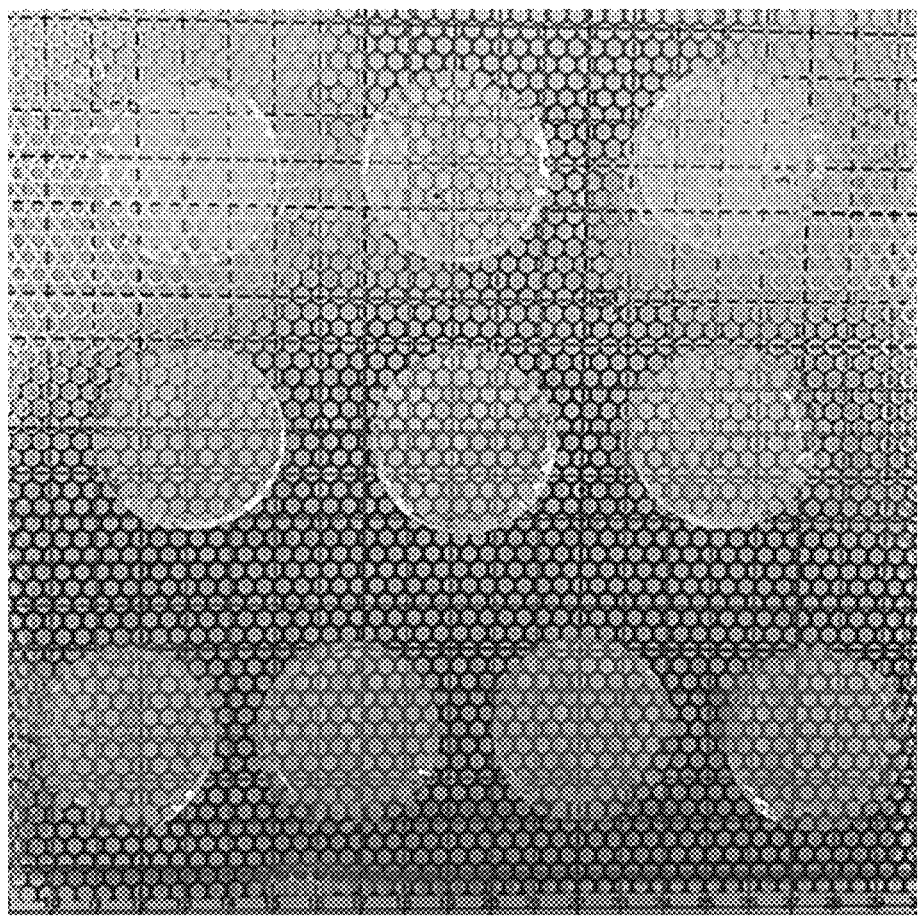
FIG. 8 is a photograph illustrating appearance of 10 samples of the aerogel in a coin size obtained according to the present invention which were simultaneously produced.
Figure 9:
FIG. 9 is a photograph illustrating appearance of the same composition as that of the aerogel in a coin size illustrated in FIG. 8 which was dried under the comparative condition.

Each of samples of the Example and the Comparative Example, which had been dried, was visually observed. None of the 10 samples of the Example were cracked at the end of drying as shown in FIG. 8, but, all of the samples of the Comparative Example were cracked at the end of drying as shown in FIG. 9. It is shown in FIGS. 6 and 7 that an aerogel having a larger size, high transparency, and no cracks was obtained.

<Comprehensive Evaluation>

It can be seen that the aerogel of the present invention has an extremely small number of cracks against shrinkage force during drying and is obtained by applying the drying method of the present invention. The method for drying an aerogel of the present invention was revealed to be highly productive and be capable of producing the aerogel in a larger size.

The invention claimed is:
1. An aerogel comprising:
a silsesquioxane structure;
wherein the aerogel exhibits only two exothermic peaks observed in a temperature range of 300 to 600° C. as measured by TG-DTA under an inert gas atmosphere containing 20% by volume of oxygen, and is constituted by a bulk portion filled with solids and through-holes through the bulk portion like a three-dimensional mesh, wherein the through-holes have an average internal diameter of 5 nm or more and 100 nm or less when its structure is microscopically observed, and
wherein the aerogel is a condensate of a bifunctional silane compound, a trifunctional silane compound, and a tetrafunctional silane compound.

* * * * *